Figure 1:
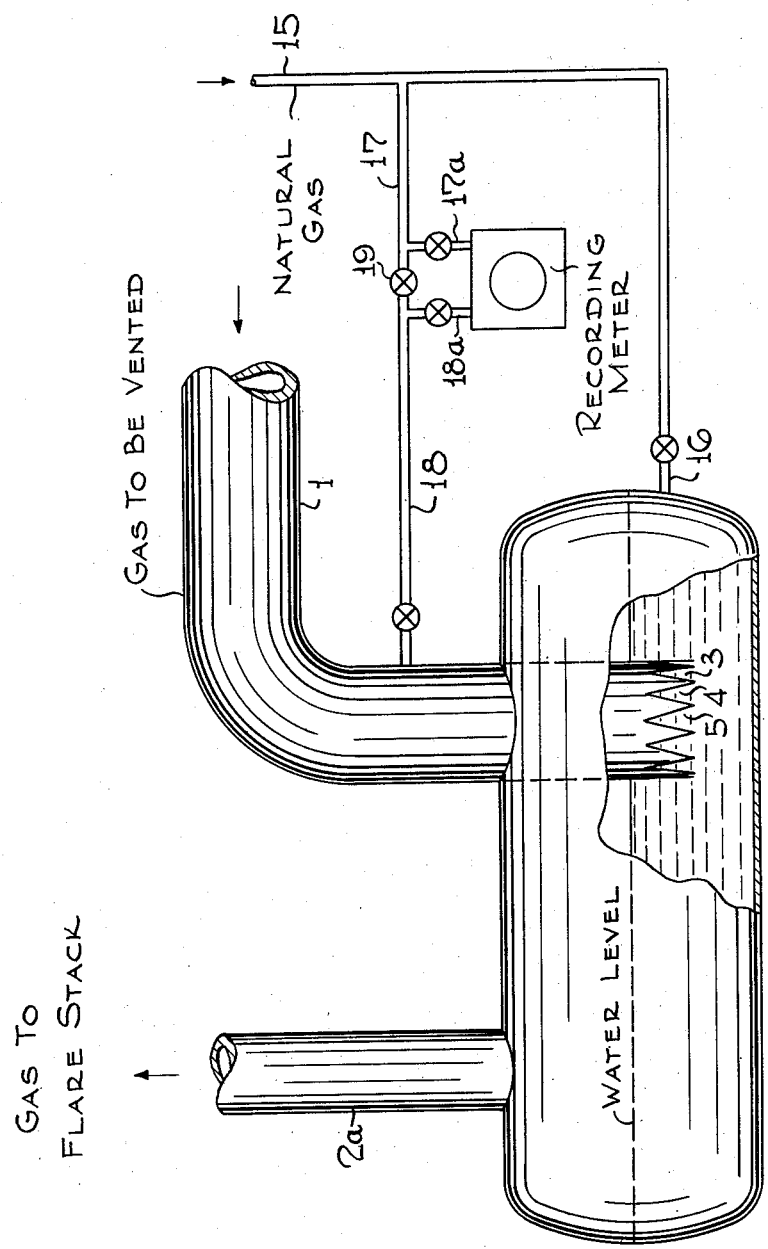

Aug. 14, 1956  H. E. TEMPLETON ET AL  2,758,473
APPARATUS FOR MEASURING GAS FLOW
Filed April 14, 1949  2 Sheets-Sheet 2

Hugh E. Templeton
Robert W. Benoliel  Inventors
By W.O.J Heilman Attorney

United States Patent Office 2,758,473
Patented Aug. 14, 1956

2,758,473

APPARATUS FOR MEASURING GAS FLOW

Hugh E. Templeton, Baton Rouge, La., and Robert W. Benoliel, Stanford, Calif., assignors to Esso Research and Engineering Company, a corporation of Delaware Application April 14, 1949, Serial No. 87,486

1 Claim. (Cl. 73—207)

This invention relates to an apparatus adapted for measuring the rate of a flow of gas over a wide range of flow rates. The invention is of particular application to the measurement of the flow of gas supplies to a flare stack used to vent hydrocarbon gases in refinery operations.

It is a particular object of this invention to provide an apparatus for gas flow determinations which will accurately measure the flow of gas through a given line without imposing a prohibitive pressure drop in the line even at high rates of gas flow. Thus, this invention is intended as an improvement over conventional gas flow measuring apparatus such as orifice meters which are characterized by high pressure drops when employed to measure relatively high gas flows.

It is a further object of this invention to provide a gas flow measuring apparatus which will have a wide range of operability to permit the measurement of both small rates of gas flow and high rates of gas flow in a ratio of a hundred fold or more. In this connection, it is the purpose of this invention to provide a measuring apparatus having a markedly broader range of satisfactory use than that ordinarily obtainable with conventional flow instruments.

One further object of this invention which may be particularly noted is a safety provision for the release of gas pressure in the gas line concerned above predetermined gas rates. In utilizing conventional flow meters, in general, when a surge of gas is received exceeding the capacity of the meter, a comparatively great back pressure will be built up in the line. One feature of the present invention is that any extraordinary surges of gas flow will be permitted to flow through the measuring apparatus with little build-up of the back pressure imposed on the gas line in which the measuring apparatus is used.

The apparatus of this invention, while broadly applicable to a wide range of gas flow determinations, is particularly applicable for measuring the flow of gas transmitted to a flare stack as used in conventional refinery operations. As is generally known, flare stacks are used in refineries to burn in the air or to release gaseous materials that cannot be utilized in the refinery. As one example: in the operation of a crude distillation system, a portion of the overhead from the distillation system may consist of light hydrocarbons in insufficient quantities to justify recovery operations. These light hydrocarbons may, therefore, be transmitted to a flare stack to be burned in the atmosphere as a waste material. In other applications gaseous materials may be conducted to a flare stack either as a more or less constant by-product stream or may be conducted to flare stacks to permit irregular or emergency releases of the gas from a particular process. Again, as an example: in the operation of distillation columns such as those known as de-propanizers and de-butanizers, it is occasionally necessary to discontinue operation of these columns for any of several reasons. When this is necessary, it is generally the practice to transmit the gases contained in the column to a flare stack.

In operations of the general type indicated, it is generally important that comparatively little back pressure be imposed on the line supplying the flare stack to prevent an undue build-up of pressure in the apparatus from which the gas is released. In many conventional flare stack lines, for example, any undue increase in the back pressure will disable safety valves installed in the lines. It is furthermore important to provide a means for measuring the quantity of gas flow supplied to the flare stack over a range of gas flows varying as much or more than a hundred fold in order to supply desired information as to the quantity of gas lost to the flare. The manner in which the apparatus of this invention supplies these needs will be fully understood from a consideration of the following description prepared with reference to the accompanying drawings in which Figure 1 diagrammatically illustrates one embodiment of this invention in elevational cross-section detail, and in which Figure 2 shows more clearly in elevation the type of weir device on which the operation of this invention depends.

Figure 2:
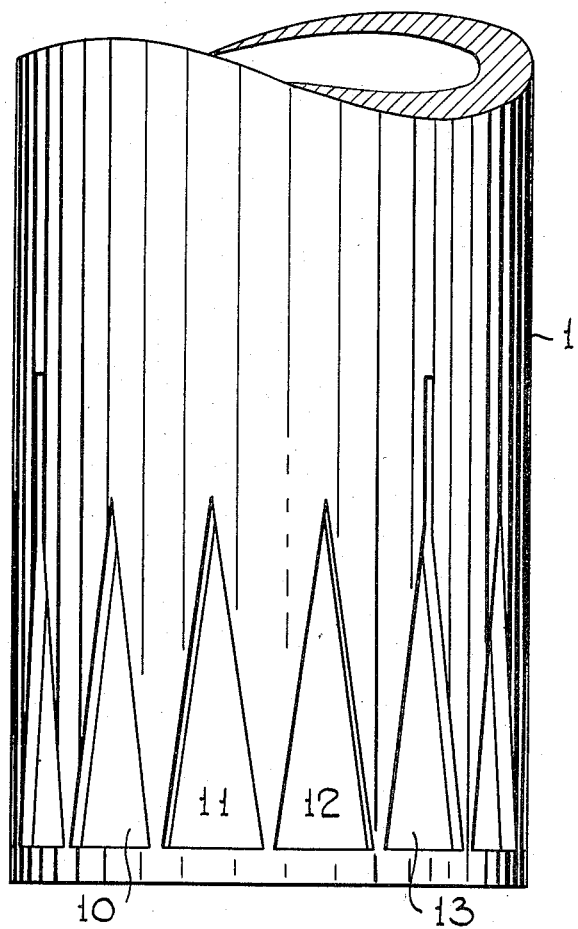

Referring now to Figure 1, the general nature of this invention may be appreciated. The gas flow line indicated by the numeral 1 may be any gas line carrying gases to be supplied to a flare stack. Thus the line 1 may lead from the overhead of distillation towers, cracking apparatus, or any other type of process from which it is desired to vent gases to a flare. According to the conventional practice, line 1 is led into a liquid seal drum 2 so that the opening of the gas line 1 is beneath the level of liquid in the seal drum 2. The liquid in the seal drum may be of any desired nature but must be noncombustible, and for this purpose water, of course, is generally used. Sufficient water is maintained in the seal drum 2 so as to completely cover the outlet end of the gas line 1. It is thus necessary for gas entering the seal drum to bubble through the liquid in the drum in a manner which provides a water seal in the flow of gas into and through the drum. Gas may then be taken from the drum through the gas line 2a to be conducted to a flare stack or to be disposed of as desired.

In accordance with this invention, the end of gas line 1 is perforated with a series of triangular perforations indicated by the numbers 3, 4, and 5, etc. Effectively, these perforations act as inverted triangular shaped weirs for the flow of gas. Thus, in order for gas to pass through the gas line 1 into the seal drum 2, it is necessary that the gas depress the water level in the inner end of the gas line 1 sufficiently so that the gas can escape under the triangular weirs. Clearly, as the amount of gas flow through line 1 is increased, it will be necessary that the gas further depress the water level within the inner end of the gas line 1 so as to permit the gas to flow through the larger diverging portions of the weirs.

It is particularly notable that when the gas rate has increased to such an extent as to depress the water level in the inner end of gas line 1 completely to the bottom or end of the gas line, greater surges of gas may be tolerated without increasing the back pressure on gas line 1. It is apparent that the quantity of gas flow through the type of weirs illustrated may be readily determined from a determination of the extent to which the water level within pipe 1 is depressed. Alternatively, the rate of gas flow may be determined by ascertaining the pressure drop of the gas as it passes through the weirs. Before considering the manner in which the gas rate is determined it may be helpful to refer to Figure 2 of the drawings for a clearer conception of the type of weirs which may be used at the submerged end of the gas line 1.

Referring to Figure 2, the portion of gas line 1 corresponding to the submerged end of the gas line is illustrated. As indicated in this drawing, the end of gas line 1 may be perforated by a large number of triangularly shaped perforations indicated by the numbers 10, 11, 12, 13, etc. These perforations are so positioned that the base of the triangular apperture is at the lower end of gas line 1. It is apparent that the number of these perforations and that the shape of these perforations is not particularly critical. Thus a comparatively few triangular perforations of the nature indicated could be utilized or a relatively large number of perforations may be used as illustrated. Again, while the perforations are illustrated and have been described as being triangular perforations, other shapes may be used and in some applications should preferably be used. In this connection it is apparent that any elongated perforation positioned so that the longest portion of the perforation is more or less parallel with the axis of gas line 1 could be employed. However, in order to secure the greatest range of gas flow determinations, it is desirable to employ perforations of a more or less triangular shape as illustrated in the drawings. This is true for the reason that a comparatively small increment in low gas flows will cause a comparatively large drop in water level at the upper portion of the triangular apertures or, as a corollary to this, at high rates of gas flow a comparatively great increase of gas flow will not cause as great a difference in the level of water near the end of gas line 1. It is apparent that these principles can be extended to permit design of particularly shaped apertures to secure any desired accuracy of flow measurement over any desired ranges. If, for example, it is desired to measure comparatively small gas flows with high accuracy over a narrow range of flow rates the upper apex of the triangular apertures may be extended upwardly with parallel sides or very slightly converging sides as illustrated by perforation 13 of Figure 2.

It should also be observed that while Figure 2 illustrates the weirs as being perforations cut adjacent the end of line 1, the weirs if desired may simply consist of notches cut in the end of the pipe as formerly illustrated in Figure 1. While the particular size and number and shape of the weirs is not critical, as indicated, for the purpose of clarification, it may be noted that in a typical embodiment of this invention, twelve triangular apertures were cut in the end of an 18 inch diameter gas line. The triangular pattern of each of these perforations was 10 inches in altitude, having a base of 4.4 inches. It was found that weirs of this nature were adequate for measuring the flow of gases from about 30 lbs./hr. or 6 cu. ft./min. to 50,000 lbs./hr. or 10,000 cu. ft./min. with an accuracy of ±10% over the entire range.

As formerly stated, the particular manner chosen for measuring the pressure drop through the weirs or for measuring the depression of the water level within the end of gas line 1 may be chosen from numerous possibilities. Any of the conventional types of apparatus employed for detecting a change in liquid level may be employed, for example. Again, any desired type of conventional pressure measuring equipment may be used to detect the pressure drop of gas passing through the weirs so as to permit the determination of the rate of gas flow.

While many methods may be used in conjunction with the apparatus illustrated to determine the gas flow, one method of accomplishing this is illustrated in Figure 1. As there illustrated, a small diameter feed gas line 15 is used to supply a small constant flow of a gas such as natural gas to the seal drum 2 at a point 16 below the level of water within the seal drum. The amount of gas released from line 15 into the seal drum will clearly depend upon the pressure exerted at the point 16 at the end of gas line 15. In other words, the amount of gas flowing through line 15 will be determined by the height of water above point 16 in the seal drum, it being assumed that the gas pressure within the seal drum is substantially constant. Consequently, by placing a pressure measuring tap 17 in line 15, from the pressure of line 15 it is possible to tell the height of the water above point 16. A second pressure tap 18 is then taken from gas line 1 at any point in the line but preferably at a point adjacent to the seal drum 2. By conducting pressure taps 17 and 18 to a conventional type of differential pressure recording meter, the rate of gas flow through gas line 1 may be determined by suitable calibration of the recorded differential pressures. In the arrangement as shown, the pressure taps 17 and 18 are conduit connections which form a substantially continuous conduit divided into separate parts by a valve 19. The conduit 17 is connected to the recording meter by means of a valved branch line 17a, while the conduit 18 is connected to the recording meter by means of a valved branch line 18a. These connections, as made and shown, are conventional also to provide a system in which by shutting the branch line valves, and by opening the valve 19, gas from the line 15 may be employed to purge the conduit connection 18. Also as is conventional in the meter as shown, the conduits 17 and 18 normally are connected in opposed relation through said meter. Suitable types of differential pressure recording meters of the character illustrated and described are commercially available. It is a particular feature that the type of pressure determination illustrated in Figure 1 is relatively insensitive to changes in water level within the seal drum. Thus, so long as the water level is maintained somewhat above the wells provided in the gas line 1, changes in this water level may be tolerated without materially affecting the accuracy of the gas flow measurements, provided the type of pressure detection illustrated and described is used.

Having now fully described this invention what is claimed is:

Apparatus for measuring flow of gaseous materials, including, in combination, a closed vessel containing a liquid through which gas is passed, a main tubular inlet for gases extending vertically downward into said vessel and having a bottom outlet end portion terminating below the normal liquid level in said vessel, said outlet portion comprissing an inverted outlet weir submerged normally below the general level of liquid in said vessel so that gas escaping therefrom must depress the liquid level to a degree dependent upon the rate of gas flow, said inverted weir consisting essentially of a circumferential series of individual substantially equal triangular ports in the side walls of said main tubular inlet, each of said ports converging upwardly from the lower end of said main inlet to an apex, the apexes of a plurality of said ports being in a common plane and the remainder of said ports being extended above said plane in the form of narrow vertical slots having substantially parallel walls and arranged substantially parallel to the axis of the main tubular inlet, the upper extremities of said slots determining the uppermost level of said inverted weir whereby the flow of small quantities of gases may be accurately measured by variations in the level of liquid, means for measuring said variations comprising a meter, and means for transmitting to said meter pressure differentials due to the liquid levels inside and outside of said main inlet.

References Cited in the file of this patent

UNITED STATES PATENTS

| | | |
|---|---|---|
| 732,578 | Murphy | June 30, 1903 |
| 1,206,490 | Werner | Nov. 28, 1916 |
| 1,215,669 | Liese | Feb. 13, 1917 |
| 2,153,450 | Borden | Apr. 4, 1939 |
| 2,345,464 | De Giers | Mar. 28, 1944 |
| 2,427,690 | Peterson | Sept. 23, 1947 |
| 2,703,981 | Mattix | Mar. 15, 1955 |

FOREIGN PATENTS

| | | |
|---|---|---|
| 164 | Great Britain | 1858 |
| 222,974 | Germany | June 11, 1910 |
| 572,095 | Germany | Mar. 10, 1933 |